United States Patent [19]
Mohn et al.

[11] Patent Number: 5,626,752
[45] Date of Patent: *May 6, 1997

[54] DEVICE FOR SEPARATING BIOLOGIC-ORGANIC FLOW MEDIA WITH FILTER ELEMENTS IN THE FORM OF MEMBRANE CUSHIONS

[75] Inventors: Jürgen Mohn, Reinbek; Wilhelm Heine, Hamburg; Robert Rautenbach, Sprockhövel; Rainer Mellis; Klaus Vossenkaul, both of Aachen, all of Germany

[73] Assignee: DT Membranfilter Vertriebs GmbH, Hamburg, Germany

[*] Notice: The term of this patent shall not extend beyond the expiration date of Pat. No. 5,545,320.

[21] Appl. No.: 546,178

[22] Filed: Oct. 20, 1995

[30] Foreign Application Priority Data

Oct. 21, 1994 [DE] Germany ............... 9416938 U
Nov. 9, 1994 [DE] Germany ............... 44 39 982.0

[51] Int. Cl.$^6$ ............................................. B01D 63/00
[52] U.S. Cl. .................. 210/321.75; 210/321.84; 210/232; 210/233; 210/346; 210/489
[58] Field of Search .................. 210/321.6, 321.72, 210/321.84, 321.75, 232, 233, 446, 335, 489, 492, 456, 346; 92/9, 11

[56] References Cited

U.S. PATENT DOCUMENTS

| | | | |
|---|---|---|---|
| 3,796,313 | 3/1974 | Bigt et al. | 210/321.75 |
| 4,501,663 | 2/1985 | Merrill | 210/321.84 |
| 4,698,154 | 10/1987 | Mohn et al. | 210/232 |
| 4,982,657 | 1/1991 | Mohn et al. | 210/232 |
| 5,106,506 | 4/1992 | Schmidt et al. | 210/321.84 |
| 5,310,487 | 5/1994 | LaMonica | 210/321.84 |

FOREIGN PATENT DOCUMENTS 3715183 11/1988 Germany.

*Primary Examiner*—Ana Fortuna
*Attorney, Agent, or Firm*—Robert W. Becker & Associates

[57] ABSTRACT

A device for filtering and separating a flow medium by reverse osmosis, micro filtration, ultra filtration, or nano filtration has a pressure-tight housing having an inlet for the flow medium and a first outlet for the retentate and a second outlet for the permeate. A plurality of stacked units comprised of spaced apart membrane filter elements is provided, wherein the membrane filter elements are stacked atop one another to form a stack. The stacked units are sequentially arranged in the housing. The flow medium flows in sequence through the stacked units. Each one of the membrane filter elements includes areal outer membrane elements and an areal stabilizing element positioned between the areal outer membrane elements.

16 Claims, 6 Drawing Sheets

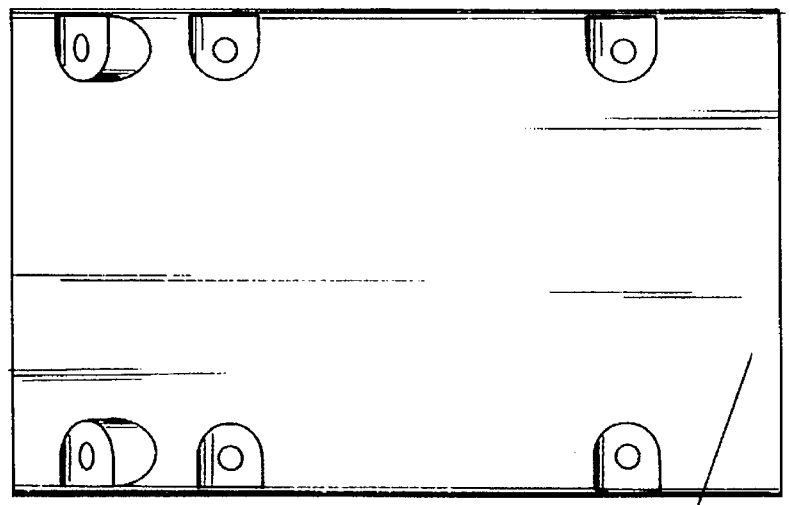
FIG-5    19(20)
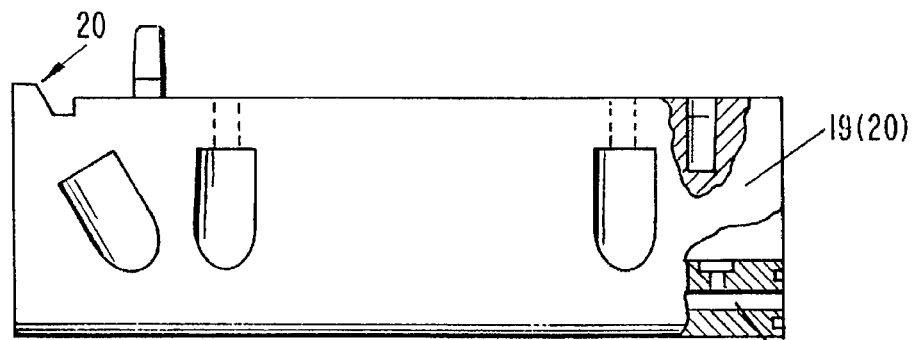
FIG-6
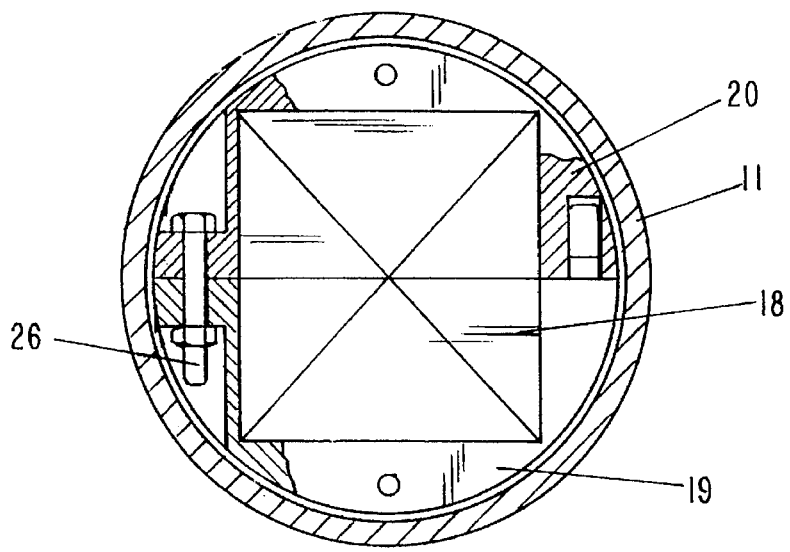
FIG-7

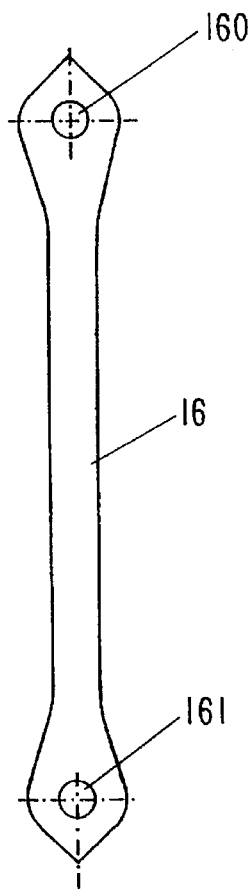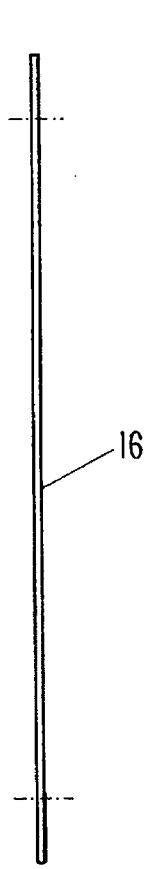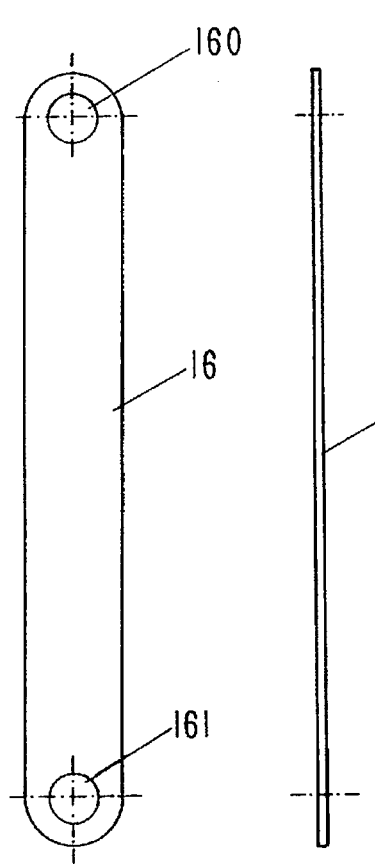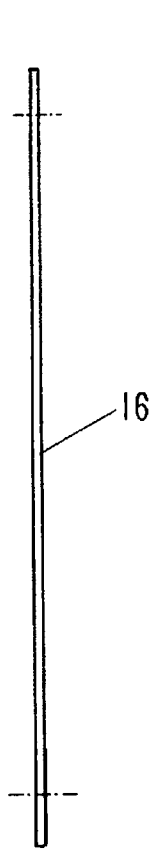
FIG-11a  FIG-11b  FIG-12a  FIG-12b
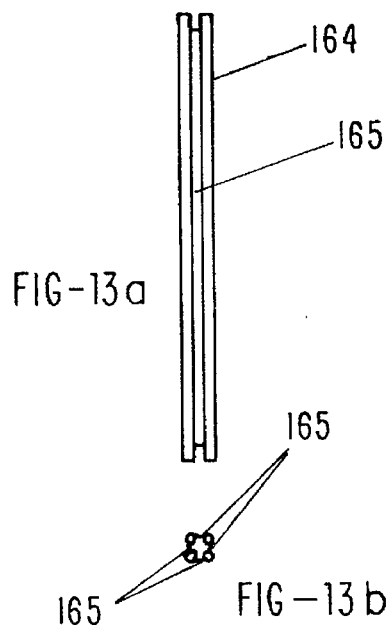
FIG-13a
FIG-13b

DEVICE FOR SEPARATING BIOLOGIC-ORGANIC FLOW MEDIA WITH FILTER ELEMENTS IN THE FORM OF MEMBRANE CUSHIONS

BACKGROUND OF THE INVENTION

The present invention relates to a device for filtering and separating especially biologic-organic flow media by reverse osmosis as well as by microfiltration, ultrafiltration, and nanofiltration with a pressure-tight housing having an inlet for the flow medium and outlets for the retentate as well as for the permeate. A plurality of spaced-apart filter elements are arranged within the housing which are in the form of a membrane cushion and along which the flow medium passes.

A device of the aforementioned kind is, for example, known from German Patent 37 15 183. In this known device the flow medium to be separated is introduced via an inlet of the device and passes in a controlled, regular pattern through the membrane cushions arranged between spacer elements so as to flow alternatingly from the exterior to the interior and from the interior to the exterior of the membrane cushion until it exits, after flowing past all of the membrane cushions, the device as an enriched retentate. The spacer elements are circular and the membrane cushions can also be of a circular design or, in approximation of a circular shape, may have the contour of a polygon.

With the known device very good results are achieved for certain applications such as salt water desalination, i.e., for producing potable water from salt water, whereby in the known device, even for large filter element stacks, the partial pressure differences of the flow medium between inlet and outlet remains within reasonable limits.

However, when flow media, for example, liquids with a high contents of biologic-organic and/or inorganic compounds must be separated, the rapid, disadvantageous formation of a filter cake can be observed, because the compounds contained in the flow medium will deposit on the membrane cushions, respectively, at locations of the spacer elements at which the flow velocities of the flow medium is lower than at other locations of the device or at projections that extend upwardly from the surface of the spacer elements. This results in the device losing its separating capacity so that the device must be demounted and, if necessary, cleaned in a very complicated manner. Such a procedure is disadvantageous and cannot be performed regularly because for many applications the device must function without requiring servicing, because an interruption of the operation of the device for cleaning, maintenance, and replacement purposes would result in unacceptable ecological and economical consequences.

It is therefore an object of the present invention to provide a device of the aforementioned kind which is able to separate liquids with a high biologic-organic and/or inorganic material contents whereby no deposits in form of filter cakes should result during operation. Furthermore, the device, if this should become necessary, should allow for simple cleaning and maintenance and should provide for an inexpensive and simple manufacture. It should also be adaptable to individual loading degrees of the liquids to be separated.

SUMMARY OF THE INVENTION

The device for filtering and separating a flow medium by one of the methods selected from the group consisting of reverse osmosis, microfiltration, ultrafiltration, and nanofiltration, according to the present invention is primarily comprised of:

a pressure-tight housing having an inlet for the flow medium and a first outlet for the retentate and a second outlet for the permeate;

a plurality of stacked units comprised of spaced apart membrane filter elements, wherein the membrane filter elements are stacked atop one another to form a stack;

the stacked units sequentially arranged in the housing, wherein the flow medium flows in sequence through the stacked units; and each one of the membrane filter elements comprises areal outer membrane elements and an areal stabilizing element positioned between the areal outer membrane elements.

The areal stabilizing element has a peripheral edge beveled at both faces of the areal stabilizing element. The areal stabilizing element is preferably comprised of plastic material.

For spacing the stacked membrane filter elements, strip-shaped spacer elements are provided. The stacks have a permeate outflow space delimited by the membrane filter elements and the spacer elements, wherein the spacer elements seal the permeate outflow space between the membrane filter elements.

Advantageously, the stacks have an open flat rectangular flow cross-section.

Expediently, each one of the stacked units further comprises two receptacle parts for enclosing the stack of the membrane filter elements, the receptacle parts having a substantially semi-circular outer contour.

At least one of the receptacle parts has a permeate channel extending in a longitudinal direction of the stacked unit and permeate outlets provided at a bottom of the at least one receptacle part, the permeate outlets communicating with the permeate channel.

The receptacle parts preferably have a substantially rectangular inner cross-section.

The receptacle parts are advantageously detachably connected to one another with connecting elements for enclosing the stacks.

Preferably, the receptacle parts form a receptacle and the receptacles are detachably connected to one another with a bayonet joint having cooperating joint parts connected to each one of the receptacles. The device further comprises a securing means for detachably securing the receptacles to one another when detachably connected with the bayonet joint.

The receptacle parts and/or the spacer elements are expediently made of plastic. The plastic for he receptacle parts and/or the spacer elements may be polystyrene, acrylonitrile butadiene styrene copolymer, styrene acrylonitrile copolymer (SAN), or "Luran" (trademark of BASF Corporation for SAN).

According to the present invention, the housing contains a plurality of separate stacks of membrane filter elements arranged adjacent and sequentially to one another, whereby the flow medium flows through them in sequence.

The advantage of the inventive device is that with the inventive arrangement of the stacks of spaced-apart filter elements within the device, i.e., within the housing, a substantially open channel is provided for the flow medium with which, in contrast to the aforementioned devices of the prior art, extremely high flow velocities of the flow medium between the inlet of the flow medium and the outlet of the retentate leaving the device is possible. This prevents the formation of deposits, for example, in the form of a filter cake, since the stacks of membrane filter elements essentially are free of any dead zones for the flow medium flowing longitudinally through the device. The flow medium can essentially flow without deflection from the inlet to the outlet of the device.

The inventively suggested quasi-open channels for the flow medium as well as the dead zone-free and deflection-free flow ensures a minimum pressure loss of the device.

Depending on the type of the materials used, especially for the outer membrane elements of the membrane cushion, the membrane cushions are more or less stable. In order to prevent that the membrane cushions within a stack contact one another during operation of the device, which could again result in the deposition of compounds or materials contained within the flow medium at the point of contact and thus in an increasing reduction of the separation efficiency of the membrane cushions, it is advantageous to provide an areal stabilizing element within the membrane cushions placed between the outer membrane elements of each membrane cushion.

In this context it is advantageous that the stabilizing elements have a peripheral edge that is beveled at both faces of the areal stabilizing element in order to provide for an improved flow behavior of the flow medium within the edge portion of the membrane cushion, on the one hand, and, on the other hand, to prevent possible damage of the outer membrane elements due to the presence of sharp edges.

A further advantage of such a stabilizing element arranged within the membrane cushion is the formation of a flow channel with membrane elements on either side. This results in a reduction of the specific energy consumption (energy consumption per $m^3$ of permeate) in comparison to known devices.

The stabilizing element is advantageously made of plastic. However, in general, any other suitable material, for example, composite materials or metals, can be used. The choice of a material for the stabilizing element depends essentially on the kind of the flow medium and the system pressure at which the device is operated with respect to the flow medium.

It has been proven to be advantageous to employ strip-shaped (bar-shaped) spacer elements for providing spacing between the membrane filter elements, even though, in general, it is also possible to use annular spacer elements positioned about the permeate outflow openings of the membrane cushions. A strip-shaped spacer element may facilitate the assembly of the membrane cushion stack.

According to an advantageous embodiment of the invention, a stacked unit is formed by enclosing the stack of membrane filter elements with two receptacle parts, each having a substantially semi-circular outer cross-sectional contour. Thus, it is possible to prefabricate a stacked unit comprised of a stack of membrane filter elements enclosed by the receptacle parts so that the resulting stacked units must only be placed adjacent to one another (sequentially) into the housing of the device, whereby the number of stacked units is selected as a function of the degree of loading of the liquid to be separated.

In order to limit the number of individual components of the device, especially with respect to providing an inexpensive manufacture, it is advantageous that at least one of the receptacle parts is provided with a permeate channel extending in the longitudinal direction of the receptacle part. This channel is connected to permeate outlets that are provided at the inner bottom of the receptacle part. With this embodiment, the permeate channel is essential an integral part of the receptacle parts.

Advantageously, the inner cross-section of the receptacle parts is substantially rectangular and of such a size that the membrane filter element stack is frictionally secured between the two receptacle parts having a semi-circular outer contour. This means that the membrane filter elements, together with the interposed spacer elements, are received in the receptacle such that no additional clamping bolts are required which, in the device of the prior art, pass through the membrane filter elements and the spacer elements.

This frictional connection of the stacks, comprised of membrane filter elements and spacer elements, and the receptacle parts can advantageously be achieved by detachably connecting the receptacle parts with connecting means for enclosing the respective stack. The connecting means may be in the form of a bolt/nut connection.

According to another advantageous embodiment of the invention, the receptacle comprised of two connectable receptacle parts can be connected to an adjacent receptacle with a bayonet joint having cooperating parts connected to both of the receptacles. This means that the adjacently placed receptacles can be easily frictionally connected to one another. With this method of connecting the receptacles to one another, any desired number of receptacles can be connected sequentially whereby their number depends on the contents of materials/compounds in the liquid to be separated, respectively, on other necessary specifications with regard to the desired degree of separation to be achieved with the device.

Two neighboring receptacles may be detachably secured to one another when connected with the connecting means, for example, with a bolt/nut connection. This securing means also allows for a complete premounting of a certain number of receptacles for insertion into the housing of the device.

The spacer elements and/or the receptacle parts, in general, can be produced of any suitable material. Preferably, they are made of plastic material so that these parts can be manufactured in a simple and inexpensive way, for example, by injection molding. Thus, these parts and elements can be mass-produced inexpensively.

Suitable plastic materials are, for example, polystyrene, acrylonitrile butadiene styrene copolymer (ABS), styrene acrylonitrile copolymer (SAN) or "Luran" (trademark of BASF Corporation for SAN).

BRIEF DESCRIPTION OF THE DRAWINGS

The object and advantages of the present invention will appear more clearly from the following specification in conjunction with the accompanying drawings, in which:

FIG. 5 shows a top view of a receptacle part according to the representation of FIG. 1;

FIG. 6 shows in a side view a receptacle part according to FIG. 5;

FIG. 7 shows a schematic sectional view of a receptacle comprised of two receptacle parts after insertion into the housing;

FIG. 10b is a side view of the stabilizing element of FIG. 10a;

FIG. 11a shows a plan view of the spacer element;

FIG. 11b shows a side view of the spacer element of FIG. 11a;

FIG. 12a shows a plan view of another embodiment of the spacer element;

FIG. 12b shows a side view of the spacer element of FIG. 12a;

FIG. 13a is a side view of a drainage bolt;

FIG. 13b is a plan view of the bolt of FIG. 13a; and

DESCRIPTION OF PREFERRED EMBODIMENTS

Figure 1:
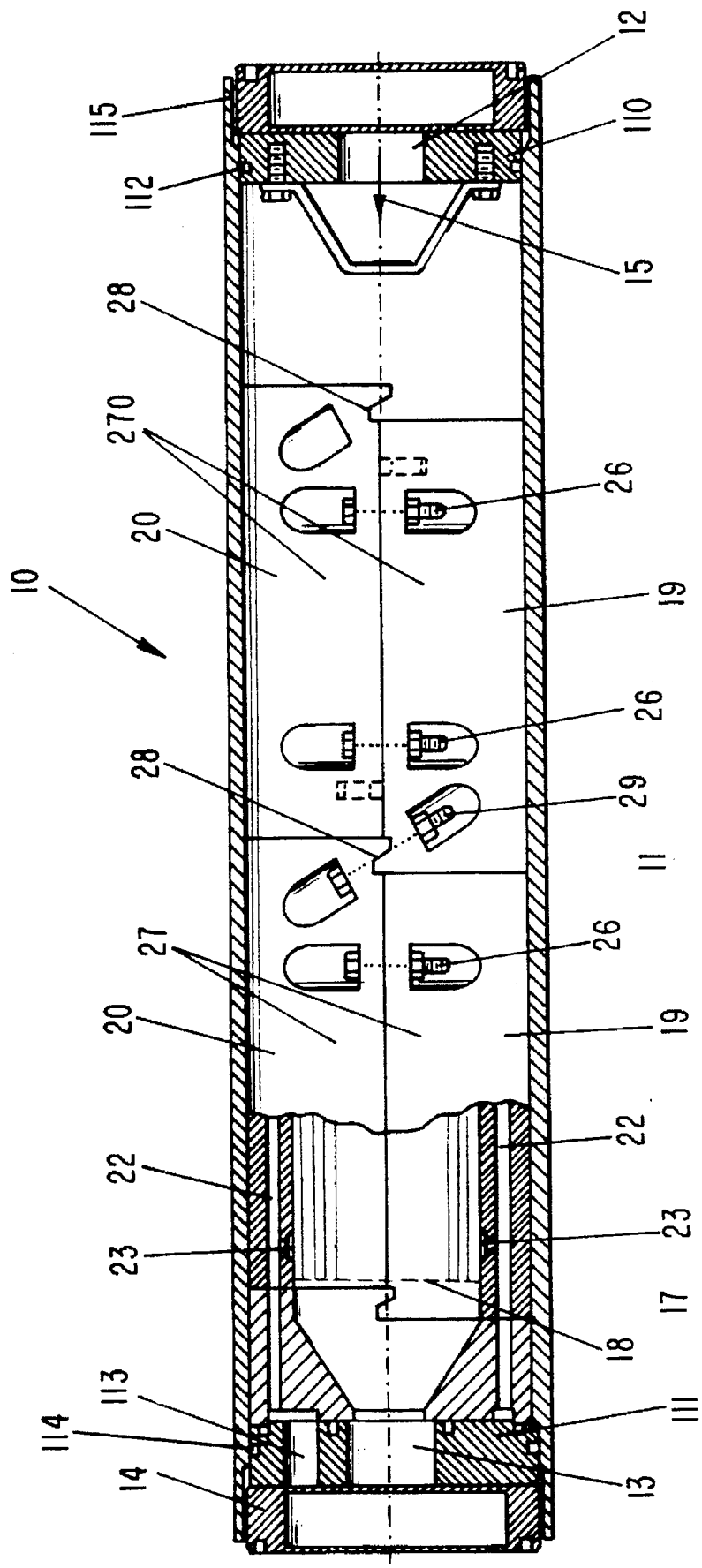
FIG. 1 shows in a side view and partially in section the device with two receptacles in which a stack of a plurality of spacer elements and interposed membrane filter elements is arranged, respectively.

The present invention will now be described in detail with the aid of several specific embodiments utilizing FIGS. 1 through 13b.

The device 10 is comprised substantially of a housing 11 that, in a manner known per se, is provided on both ends with end elements 110, 111 for sealing the housing 11 in a pressure-tight manner with circumferentially extending sealing means 112, 113, for example, in the form of so-called O-rings. The end element 110 is provided with an inlet 12 for the flow medium 15 to be supplied to the device 10. The end element 111 has an outlet 13 for the enriched flow medium, the so-called retentate, and an outlet 14 for the permeate. The end elements 110, 111 are secured in their position at the housing 11 with annular elements 114, 115 having an exterior thread whereby the housing 11 at the corresponding location is provided with an inner thread for engaging the annular elements 114, 115. The housing 11 has preferably a circular cross-section. However, this is not necessary in all embodiments.

Figure 2:
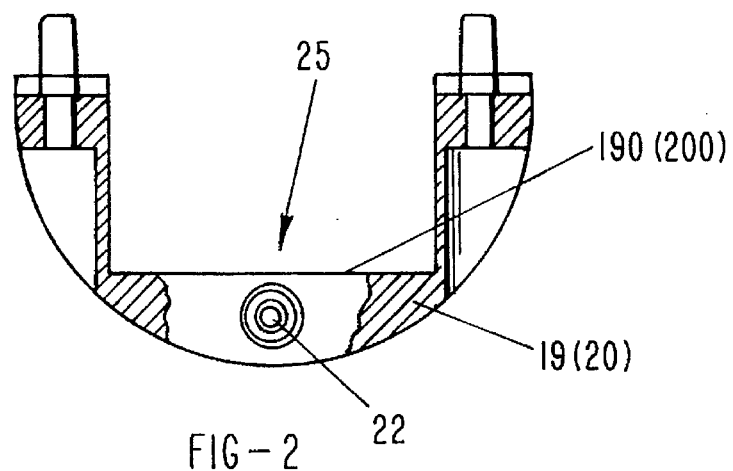
FIG. 2 shows in an end view transverse to the representation of FIG. 1 a part-sectional view of a receptacle part.
Figure 3:
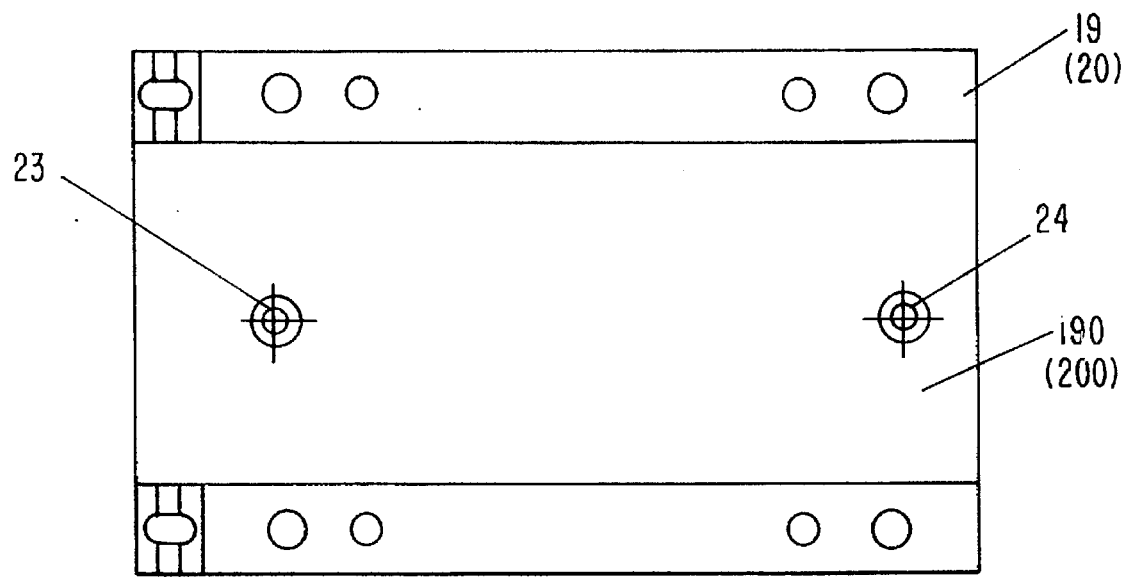
FIG. 3 is a plan view of the receptacle part represented in FIG. 2 showing the bottom with permeate outlets.
Figure 4:
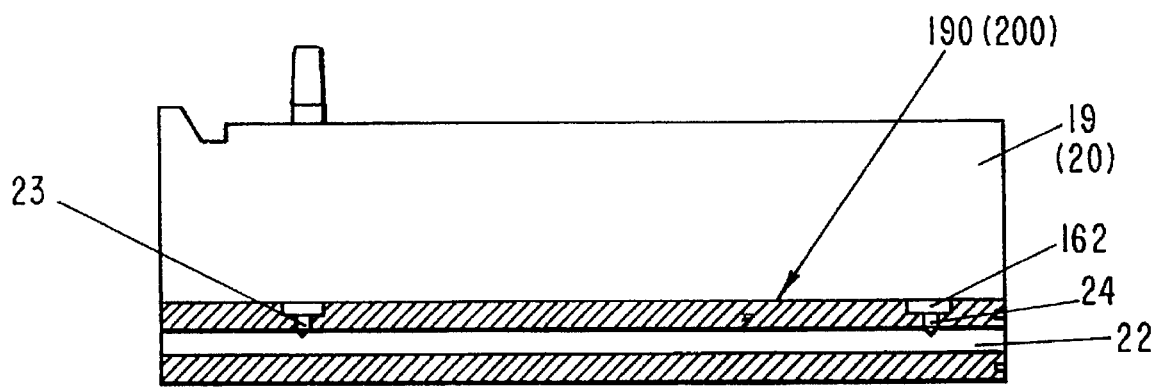
FIG. 4 shows a longitudinal section of the receptacle part represented in FIG. 3.
Figure 8:
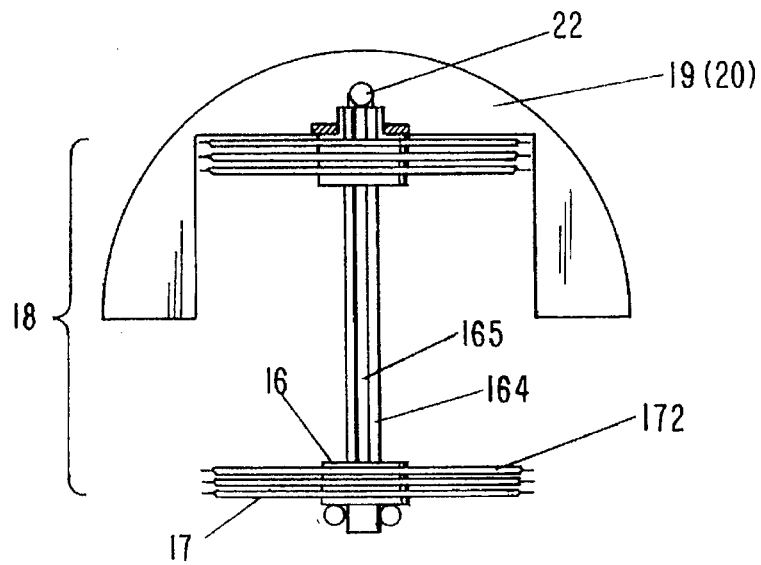
FIG. 8 shows in a view transverse to the representation of FIG. 1 a section of the receptacle part with partial membrane filter element stack wherein the filter elements are separated (spaced) by spacer elements (the stack is shown incomplete to avoid crowding of the drawing)
Figure 9:
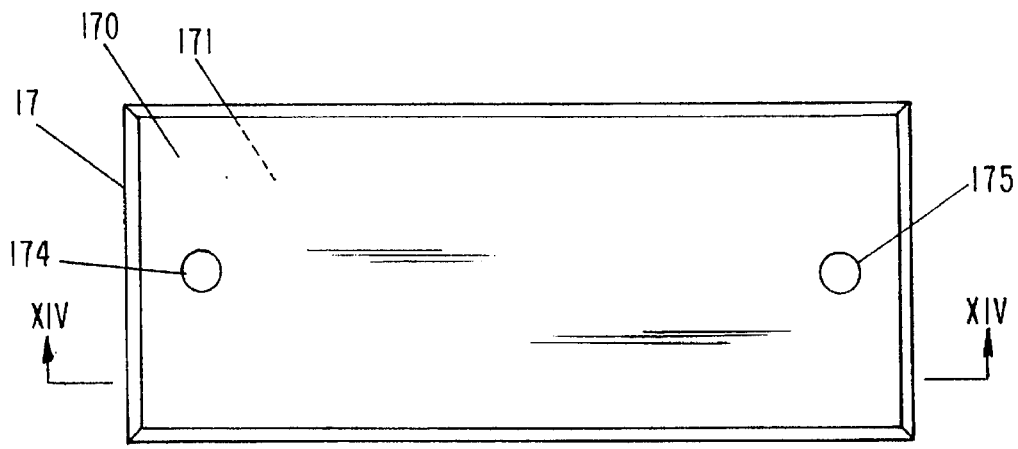
FIG. 9 shows a plan view of a membrane filter element.
Figure 10A:
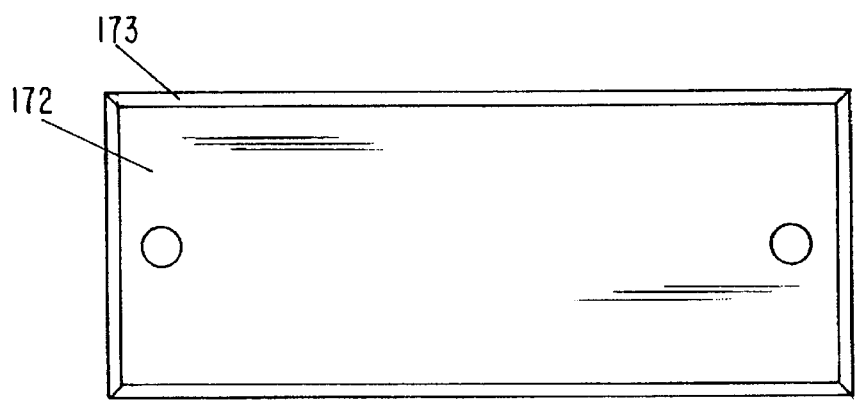
FIG. 10a shows a plan view of the stabilizing element positioned between the outer membrane elements.
Figure 10B:

In the housing 11 a plurality of receptacles 27, 270 are provided whereby in the shown embodiment according to FIG. 2 two receptacles 27, 270 are shown. It should be mentioned that the number of receptacles 27, 270 for each device 10 can be selected as desired as a function of the length of the housing 11 and also as a function of the liquid to be separated, respectively, the type and amount of organic and/or inorganic compounds/materials contained in the liquid.

The receptacles 27, 270 are all identical to one another so that in the following only of the receptacles 27 will be described. The receptacle 27 is comprised of two receptacle parts 19, 20, see FIGS. 7 and 8. The receptacle parts 19, 20 have a substantially semi-circular outer cross-sectional contour. The inner cross-sectional contour of the receptacle parts 19, 20 is substantially rectangular whereby two of the receptacle parts 19, 20 (see FIG. 7) that are connected to one another have a substantially square, respectively, rectangular inner cross-section. The receptacle parts 19, 20 can be detachably connected to one another with connecting means 26, for example, a bolt/nut connection. Two receptacle parts 19, 20 enclose in a frictional manner a stack 18 that is comprised of a plurality of spacer elements 16, see FIGS. 8 to 10, and whereby between two adjacent spacer elements 16 a membrane filter element 17 is arranged respectively. The membrane filter element 17 of the kind to be used in the present invention for forming the stack 18 together with the spacer elements 16 is, for example, disclosed in European Patent 0 129 663. The membrane filter element 17 to be used in connection with the inventive device 10 has a construction as disclosed in the above mentioned European patent document. Thus, with respect to design and construction of the membrane filter element 17 reference is made to this aforementioned document.

Figure 14:
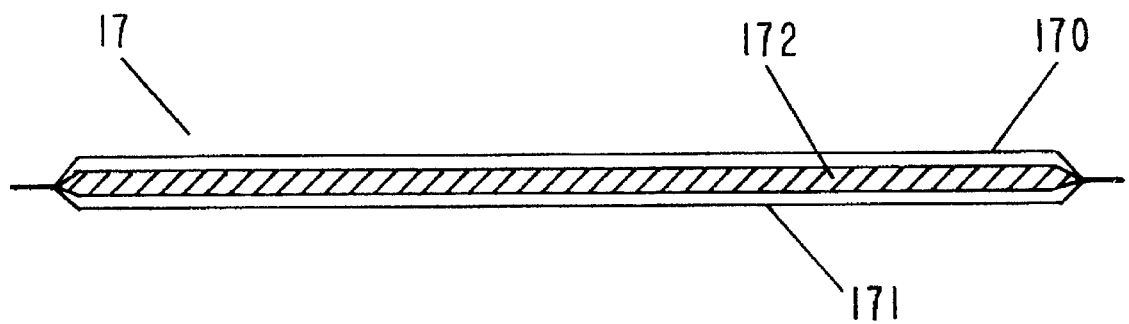
FIG. 14 shows a section along ling XIV—XIV of FIG. 9.

The known membrane filter elements (membrane cushions) 17, however, have been modified such that an areal stabilizing element 172 is arranged between the outer membrane elements 170, 171 that delimit the membrane cushion 17 (See FIG. 14). The stabilizing element 172 is comprised of plastic, metal or any other suitable material and has a peripheral edge 173 that is beveled on both faces of the stabilizing element 172 (see FIG. 10b).

The spacer element 16 is substantially strip-(bar)-shaped (see FIGS. 11, 12). Permeate outlet openings 160, 161 are provided which are spaced from one another in the longitudinal direction. The spacer element 16 is comprised advantageously of rubber or any suitable plastic material (see FIGS. 11a, 11b, 12a, 12b). The openings 160, 161 are congruent with permeate outflow openings 174, 175 of the membrane cushions 17 (see FIG. 9). The permeate outlet openings 160, 161 and the permeate outflow openings 174, 175 form the permeate outflow space of the stack. The spacer element 16 has a sealing effect relative to the two membrane cushions 17 between which it is positioned and determines the spacing therebetween according to its thickness. Within the assembled stack 18 comprised of membrane cushions 17 (see FIG. 8) the flow medium 15 cannot flow into the permeate outflow openings 174, 175 due to the sealing action of the spacer elements 16.

The permeate outlets 23, 24 in the bottom 190 of the receptacle parts 19, 20, which in the longitudinal direction have the same distance relative to one another as the openings 160, 161 of the spacer elements 16, open into a permeate channel 22 extending in the longitudinal direction of the receptacle parts 19, 20. The outlet bolt 164 (see FIGS. 13a, 13b) extends through the entire stack 18 comprised of membrane cushions 17 and spacer elements 16, see FIG. 8. In the axial direction the bolt 164 has a plurality of permeate flow grooves 165 via which the permeate exiting from the membrane cushions 17 via the permeate outlets 174, 175 flows into the permeate outlets 23, 24 of the receptacle parts 19, 20.

The aforedescribed stack 18 is thus frictionally enclosed between two receptacle parts 19, 20 with the aid of connecting means 26 whereby in the connected state of the receptacle parts 19, 20 it is ensured that the permeate, separated by the membrane filter elements 17, flows via the outlet bolts 164 at the ends of the filter element 17 from the permeate outflow openings 174, 175 of these filter elements 17 into the permeate outlet openings 160, 161 of the spacer elements 16 and to the permeate outlets 23, 24 of the receptacle parts 19, 20 in order to be collected within the permeate channel 22. From the permeate channel 22 the permeate is then guided to the outlet 14 of the device 10.

Two adjacent receptacles 27, 270 of the aforedescribed construction can be detachably connected to one another with a bayonet joint 28 having parts connected to both of the receptacles. In the connected state the bayonet joint 28 connecting two neighboring receptacles 27, 270 can be secured with a connecting means 29. This connecting means 29 can, for example, be in the form of a bolt/nut connection similar to the connecting means 26 for connecting the two receptacle parts 19, 20.

The spacer element 16 and/or the receptacle parts 19, 20 can be comprised of plastic material, preferably of a plastic material that is injection-moldable. The plastic material can be polystyrene, acrylonitrile butadiene styrene copolymer (ABS), styrene acrylonitrile copolymer (SAN) or Luran. The spacer element 16 may also be made of rubber.

For the intended operation of the device 10, a certain number of stacked units comprising the stacks 18 and the receptacles 27 are prepared in the aforedescribed manner. The prepared, i.e., preassembled, stacked units (represented in the drawing by the receptacles 27 that have enclosed therein the stacks 18 comprised of spacer elements 16, filter elements 17 and bolts 164) are then connected to one another with the bayonet joint 28 provided at two adjacent receptacles 27, 270 and are secured with connecting means 29. Subsequently, the plurality of interconnected stacked units are inserted into one opening (for example, at 110) of the housing 11 whereby it is ensured that the permeate channels 22 of the individual receptacles 27 are connected to one another so as to be pressure-tight. The permeate channel 22 of the last receptacle 27 must open into a corresponding opening of the end element 111 that closes off, the opposite housing opening. Subsequently, the housing 11 is closed off with the second end element 110 via the annular element 115 whereby it is ensured that an axial movement of the stacked interconnected receptacles 27 within the housing 11 is not possible. For the inventive operation, the flow medium (arrow 15) is then introduced into the device 10 so as to flow through all of the membrane filter elements 17 arranged behind one another essentially in the form of an open channel. The sequential arrangement of the receptacles 27, respectively, the stacks 18 positioned therein provides for such an "open channel" flow. Thus, a high flow velocity of the flow medium (15) is ensured from the inlet 12 to the outlet 13. The permeate that is produced in a manner known per se by the membrane filter element 17, flows via the openings 160, 161, 174, 175 respectively, the permeate outlets 23, 24 of the receptacle parts 19, 20 to the permeate channel 22 and from there to the outlet 14 of the device 10 and is then used as desired.

The present invention is, of course, in no way restricted to the specific disclosure of the specification and drawings, but also encompasses any modifications within the scope of the appended claims.

What we claim is:

1. A device for filtering and separating a flow medium by one of the methods selected from the group consisting of reverse osmosis, microfiltration, ultrafiltration, and nanofiltration, said device comprising:

a pressure-tight housing having an inlet for the flow medium and a first outlet for the retentate and a second outlet for the permeate;

a plurality of stacked units comprised of spaced apart membrane filter elements, wherein said membrane filter elements are stacked atop one another to form a stack;

said stacked units sequentially arranged in said housing, wherein the flow medium flows in sequence through said stacked units;

wherein each one of said membrane filter elements comprises a first and a second areal outer membrane elements and an inner areal stabilizing element positioned between said first and said second areal outer membrane elements;

wherein for spacing said stacked membrane filter elements strip-shaped spacer elements are provided between neighboring ones of said membrane filter elements; and wherein each one of said stacked units further comprises a receptacle consisting of two receptacle parts for enclosing said stack of said membrane filter elements, said receptacle parts having a substantially semi-circular outer contour.

2. A device according to claim 1, wherein said areal stabilizing element has a peripheral edge slanted at both faces of said areal stabilizing element.

3. A device according to claim 1, wherein said areal stabilizing element is comprised of plastic material.

4. A device according to claim 1, wherein said stacks have a permeate outflow space delimited by said membrane filter elements and said spacer elements, wherein said spacer elements seal said permeate outflow space between said membrane filter elements.

5. A device according to claim 1, wherein said stacks have an open flat rectangular flow cross-section.

6. A device according to claim 1, wherein at least one of said receptacle parts has a permeate channel extending in a longitudinal direction of said stacked unit and permeate outlets provided at a bottom of said at least one receptacle part, said permeate outlets communicating with said permeate channel.

7. A device according to claim 1, wherein said receptacle parts have a substantially rectangular inner cross-section.

8. A device according to claim 1, wherein said receptacle parts are detachably connected to one another with connecting elements for enclosing said stacks.

9. A device according to claim 1, wherein said receptacle parts form a receptacle and wherein said receptacles are detachably connected to one another with a bayonet joint having cooperating joint parts connected to each one of said receptacles.

10. A device according to claim 9, further comprising securing means for detachably securing said receptacles to one another when detachably connected with said bayonet joint.

11. A device according to claim 1, wherein said receptacle parts are made of plastic.

12. A device according to claim 11, wherein said spacer elements are made of plastic.

13. A device according to claim 12, wherein said plastic of said spacer elements is selected from the group consisting of polystyrene, acrylonitrile butadiene styrene copolymer, and styrene acrylonitrile copolymer (Luran).

14. A device according to claim 11, wherein said plastic for said receptacle parts is selected from the group consisting of polystyrene, acrylonitrile butadiene styrene copolymer, and styrene acrylonitrile copolymer, (Luran).

15. A device according to claim 1, wherein said spacer elements are made of plastic.

16. A device according to claim 15, wherein said plastic is selected from the group consisting of polystyrene, acrylonitrile butadiene styrene copolymer, and styrene acrylonitrile copolymer (Luran).

* * * * *